United States Patent
Thor

(10) Patent No.: US 9,115,805 B2
(45) Date of Patent: Aug. 25, 2015

(54) TRANSMISSIOIN CLUTCH RETURN SPRING PRESSURE LEARN USING PID CONTROL

(75) Inventor: Todd J. Thor, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 431 days.

(21) Appl. No.: 13/411,957

(22) Filed: Mar. 5, 2012

(65) Prior Publication Data

US 2013/0231834 A1    Sep. 5, 2013

(51) Int. Cl.
*F16D 48/06* (2006.01)
*F16H 61/06* (2006.01)
*F16H 63/50* (2006.01)
*F16H 61/00* (2006.01)

(52) U.S. Cl.
CPC .............. *F16H 61/061* (2013.01); *F16H 63/50* (2013.01); *F16H 2061/0078* (2013.01); *F16H 2061/0087* (2013.01); *F16H 2061/064* (2013.01)

(58) Field of Classification Search
CPC .......... F16H 61/061; F16H 2061/0078; F16H 2061/0087; F16D 2500/30406; F16D 2500/10412
USPC ........................................................... 701/68
See application file for complete search history.

(56) References Cited

U.S. PATENT DOCUMENTS

| | | | |
|---|---|---|---|
| 5,046,383 A * | 9/1991 | Butts et al. ..................... | 477/120 |
| 5,323,320 A * | 6/1994 | Hathaway et al. .............. | 701/67 |
| 2007/0221462 A1 | 9/2007 | Rains | |
| 2009/0118935 A1 | 5/2009 | Heap et al. | |
| 2011/0077830 A1* | 3/2011 | Lochocki et al. ............... | 701/68 |
| 2011/0183811 A1* | 7/2011 | Wilke et al. .................... | 477/174 |

FOREIGN PATENT DOCUMENTS

CN        101788380 A        7/2010

* cited by examiner

*Primary Examiner* — John Q Nguyen
*Assistant Examiner* — Kyung Kim
(74) *Attorney, Agent, or Firm* — Quinn Law Group, PLLC

(57) ABSTRACT

A method for determining the return spring pressure of a clutch in a vehicle transmission includes using proportion-integral-derivative (PID) control logic of a controller to introduce a calibrated error into a pressure command of a holding clutch during a coast-down maneuver of the vehicle. The calibrated error causes a slip level to occur across the holding clutch. The method includes maintaining the slip level using the PID control logic and separately commanding engine torque at different threshold low values during the coast-down maneuver. The pressure/input torque relationship for the holding clutch is recorded for both threshold low levels as the controller continues to maintain the slip. The return spring pressure is calculated using the recorded pressure/input torque relationship. The holding clutch may be controlled a subsequent shift maneuver using the learned return spring pressure. A vehicle is also disclosed having a controller configured to execute steps of the method.

10 Claims, 2 Drawing Sheets

TRANSMISSIOIN CLUTCH RETURN SPRING PRESSURE LEARN USING PID CONTROL

TECHNICAL FIELD

The present disclosure relates to a method and system for learning the return spring pressure of a clutch in an automatic transmission using proportional-integral-derivative (PID) control.

BACKGROUND

An automatic transmission generally includes a number of gear elements and clutches that couple a transmission input shaft with a transmission output shaft. The various clutches are selectively engaged to establish a desired speed ratio. Clutch engagement is typically achieved by moving a clutch piston from an initial position into engagement with a friction clutch pack. Shifting from one speed ratio to another is performed automatically by a transmission controller which applies a clutch associated with the current speed ratio, i.e., the off-going clutch, and releases a clutch associated with a desired new speed ratio, i.e., the on-coming clutch. Upon release, a clutch return spring gently returns the apply piston to its initial position.

SUMMARY

A method is disclosed herein for accurately learning a return spring pressure of a clutch used in a vehicle transmission. Knowledge of the return spring pressure is a useful clutch control variable that can be relatively difficult to determine imperceptibly to a driver of the vehicle. The present method is executed during a coast-down maneuver to minimize driver disturbances, for instance when the vehicle is traveling on an extended downgrade and input torque to the transmission reaches a threshold level and remains sufficiently stable.

Under low engine torque conditions, a pressure command delivered to a given torque holding clutch in the transmission is held to a relatively low feed-forward critical capacity. At the same time, a controller having proportional-integral-derivative (PID) control logic introduces a small error in the pressure command to another holding clutch via the PID control logic. The controller maintains this slip. A controlled flare in turbine speed ensures and is held steady.

Once the PID response to the error is stabilized, e.g., within a calibrated +/− pressure window over a calibrated duration, the controller records a clutch input pressure/input torque relationship for the particular holding clutch whose pressure command has temporarily dropped due to the introduced error. The controller continues to hold the controlled slip during the flare. Thereafter, input torque from the engine may be adjusted downward, e.g., by requesting increased spark retardation from an engine control unit, and the entire sequence may be repeated at this lower level. Using the two recorded clutch input pressure/torque points, the controller can then calculate the return spring pressure by extrapolation or using other means, thereafter updating any required gain values used in determining clutch pressure for subsequent shift events.

The above features and advantages and other features and advantages of the present invention are readily apparent from the following detailed description of the best modes for carrying out the invention when taken in connection with the accompanying drawings.

DETAILED DESCRIPTION

Figure 1:
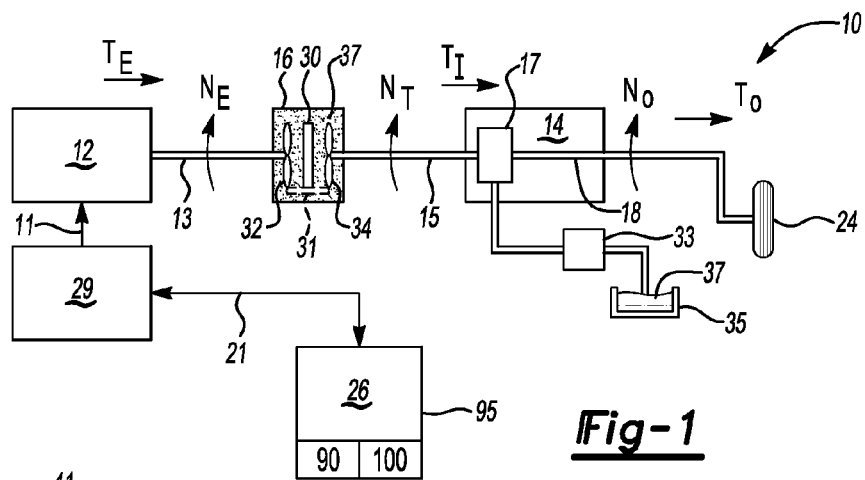
FIG. 1 is a schematic illustration of a vehicle having an automatic transmission and a controller which learns a clutch return spring pressure during a coast-down maneuver as set forth herein.

Referring to the drawings, wherein like reference numbers correspond to like or similar components throughout the several figures, and beginning with FIG. 1, a vehicle 10 includes a controller 26. The controller 26 is configured, via execution of the present method 100, to learn a return spring pressure of a clutch during a coast-down maneuver as set forth herein with reference to FIGS. 4 and 5. Any of the clutches used aboard the vehicle 10 may be evaluated using the present method 100 provided the clutch holds torque during the coast-down maneuver, i.e., acts as a holding clutch.

The vehicle 10 includes an internal combustion engine 12 that is coupled to an automatic transmission 14 via a hydrodynamic torque converter 16. The engine 12 delivers engine torque (arrow $T_E$) via an engine output shaft 13 which rotates at engine speed (arrow $N_E$). The transmission 14 includes a transmission input shaft 15 which rotates at an input speed (arrow $N_T$). Transfer of input torque (arrow $T_I$) to the transmission 14 occurs through the torque converter 16, as is understood in the art and described below.

The transmission 14 also has an output shaft 18 that ultimately conveys a transmission output torque (arrow $T_O$) transmitted from various clutch and gear sets 17 of the transmission 14. The transmission output torque (arrow $T_O$) is ultimately delivered to a set of drive wheels 24. The clutch and gear sets 17 can be selectively actuated via electro-hydraulic controls (not shown) powered by fluid that is delivered under pressure from a fluid pump 33. The pump 33 is configured to draw fluid 37 from a transmission sump 35.

Figure 2:
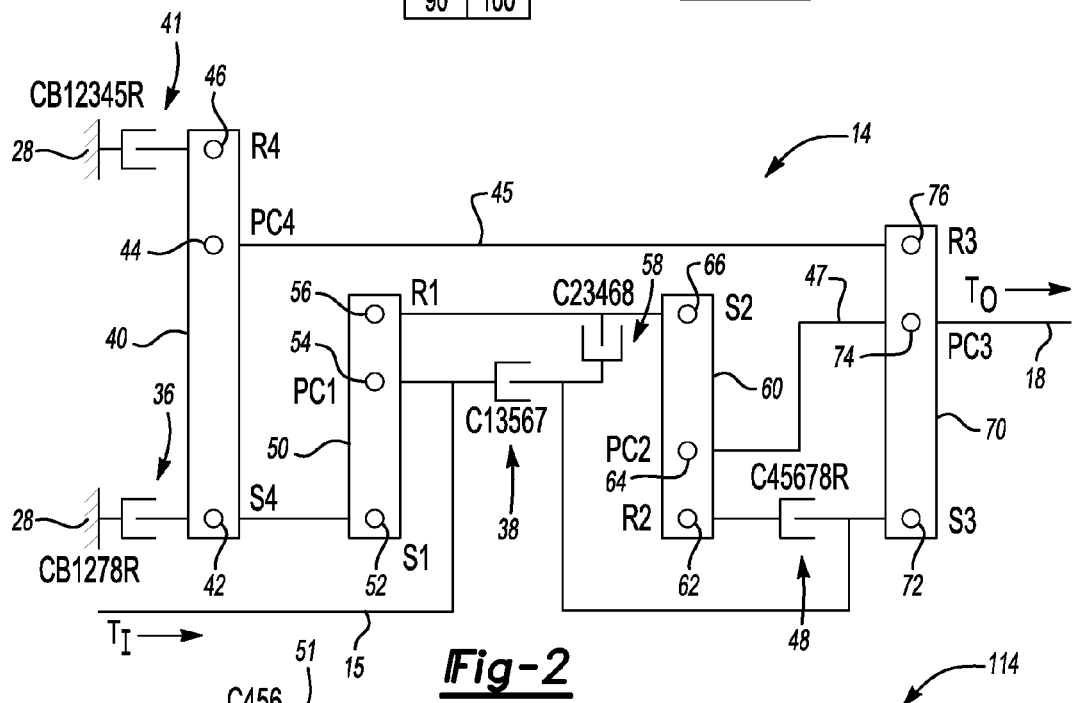
FIG. 2 is a lever diagram for an example transmission whose clutch return spring pressures may be evaluated according to the present approach.
Figure 3:
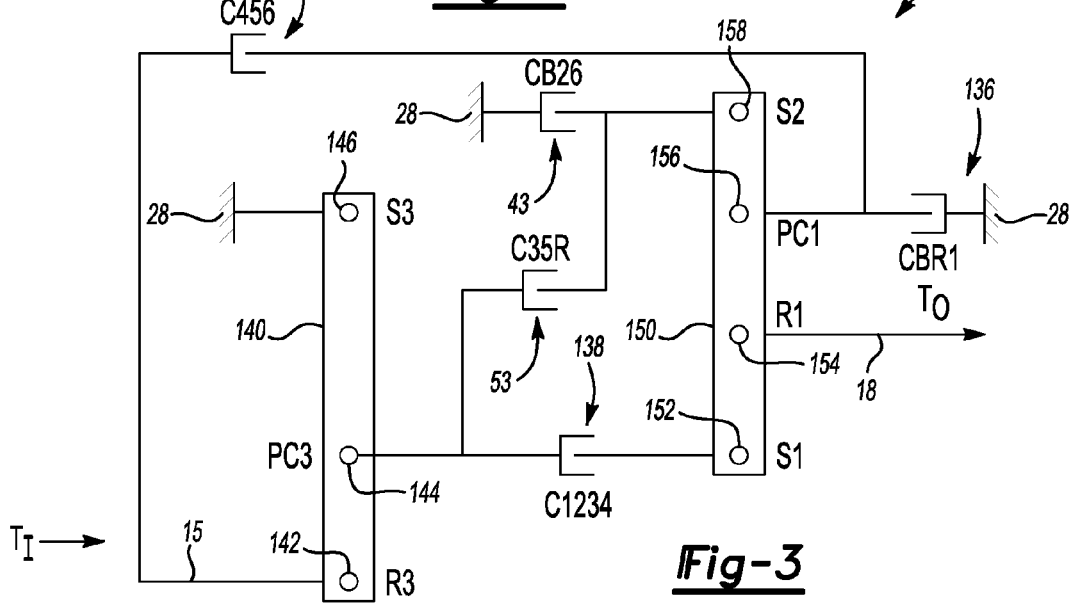
FIG. 3 is a lever diagram for an alternative example transmission to the transmission shown in FIG. 2.

The transmission 14 of FIG. 1 may be configured as any multi-speed transmission, e.g., a 6-speed or an 8-speed transmission, possible embodiments for which are described herein with reference to FIGS. 2 and 3. Thus, the clutches of the clutch and gear sets 17 may be selectively engaged and disengaged as needed to establish the desired speed ratios. In steady state, at least one of the clutches of the clutch and gear sets 17 holds input torque and is therefore referred to herein as a holding clutch.

The controller 26 selectively executes the present method 100, e.g., by executing computer code or instructions recorded on tangible, non-transitory memory 95, during a coast-down maneuver of the vehicle 10 to thereby learn the return spring pressure of the various holding clutches in the clutch and gear sets 17. An example embodiment of method 100 is disclosed below with reference to FIG. 4. Example holding clutches are described with reference to FIGS. 2 and 3.

The controller 26 may be be configured as a microprocessor-based device having such common elements as a microprocessor or CPU, and/or read only memory (ROM), random access memory (RAM), electrically-programmable read-only memory (EPROM), etc., some of which may be designated as the memory 95 noted above. The controller 26 also includes logic circuitry including but not limited to proportional-integral-derivative (PID) control logic 90, a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry.

As is understood in the art, PID refers to a control loop feedback mechanism and associated logic which uses three terms, i.e., the proportion (P), integral (I), and derivative (D) terms, with each representing the respective present, past, and future error values. The logic generating the I term is referred to as the integrator herein, with injection or introduction of a PID error via the integrator being a step in the present method 100. The present controller 26 thus uses PID logic to calculate an error value in a given process variable as a difference between a measured value and a desired or calibrated value, and controls the process inputs as a function of the three control terms.

An engine control unit (ECU) 29 could also be used either as a separate device as shown or integrated with the controller 26. If separate, the controller 26 is in communication with the ECU 29 as indicated by double-headed arrow 21. The controller 26 may request a specific level of managed engine torque (arrow 11) from the ECU 29 during the coast-down maneuver as part of the execution of the present method 100, with the ECU 29 responding via any suitable means of reducing engine torque (arrow $T_E$), e.g., spark retarding or the like.

The torque converter 16 shown in FIG. 1 has a stator 30 positioned between a pump 32 and a turbine 34. A torque converter clutch 31 may also be used to selectively lock the pump 32 to the turbine 34 above a threshold lockup speed, as will be understood by those of ordinary skill in the art. The pump 32 may be coupled to the output shaft 13 to thereby rotate at engine speed (arrow $N_E$). Within the torque converter 16, the turbine 34 is driven by fluid 37, with the turbine 34 in turn connected to the input shaft 15 of the transmission 14. Thus, rotation of the turbine 34 ultimately rotates the input shaft 15 at a turbine speed (arrow $N_T$) that is less than or equal to the engine speed (arrow $N_E$), with viscous drag or friction losses within the transmission 14 tending to reduce the turbine speed (arrow $N_T$) to a level somewhat less than engine speed (arrow $N_E$), as will be readily understood by those of ordinary skill in the art.

Referring to FIG. 2, in a non-limiting example embodiment the transmission 14 of FIG. 1 may be configured as an 8-speed transmission having a plurality of gear sets and clutches, i.e., the clutches and gears 17 of FIG. 1. In particular, the transmission 14 may include a braking clutch CB1278R, i.e., clutch 36. The nomenclature CB1278R represents that this particular device is a braking clutch (CB), and is engaged in each of $1^{st}$, $2^{nd}$, $7^{th}$, $8^{th}$, and reverse (R) gears. The transmission 14 also includes another braking clutch CB12345R, or clutch 41, which selectively connects an element of a first gear set 40 to a stationary member 28 when engaged. Clutches 36 and 41 are connected to respective nodes 42 and 46 of first gear set 40. In one embodiment, node 42 can be a sun gear (S4) of the gear set 40, while node 46 may be a ring gear (R4) of the same gear set. Gear set 40 also includes a node 44, which may be a carrier member (PC4) in the embodiment shown.

Node 42 is also connected to a node 52 of a second gear set 50. Node 54 of gear set 50 is connected to an input side of a rotating clutch C13567, i.e., clutch 38, as is the transmission input shaft 15 with input torque (arrow $T_I$). Node 56 is connected to a third gear set 60 as explained below. In one embodiment, gear set 50 may be a planetary gear set wherein nodes 52, 54, and 56 are a sun gear (S1), a carrier member (PC1), and a ring gear (R1), respectively.

The third gear set 60 includes nodes 62, 64, and 66, which in one embodiment may be ring gear (R2), carrier member (PC2), and sun gear (S2), respectively. A rotating clutch C23468, i.e., clutch 58, may be connected between the output of clutch 38 and node 66, and between node 56 of gear set 50 and node 66 of gear set 60. Node 62 may be connected to a fourth gear set 70 having nodes 72, 74, and 76. Nodes 72, 74, and 76 may be a sun gear (S3), carrier member (PC3) and ring gear (R3), respectively. In particular, node 62 may be connected to node 72 via a rotating clutch C45678R, i.e., clutch 48. Node 64 of gear set 60 may be directly connected to node 74 of gear set 70, which in turn may be connected to the transmission output shaft 18 (also see FIG. 1). Nodes 76 and 44 and nodes 74 and 64 may be continuously connected via a respective interconnecting member 45 and 47.

Referring to FIG. 3, the transmission 14 of FIG. 2 may be alternatively embodied as a transmission 114 having a 6-speed configuration. In this embodiment, the transmission input shaft 15 may be connected to a first gear set 140 having nodes 142, 144, and 146, which may be embodied as a ring gear (R3), carrier member (PC3), and sun gear (S3) as shown. The input shaft 15 may be directly connected to node 142, and to a clutch C456, i.e., clutch 51. Node 144 is connected to a clutch C1234, i.e., the clutch 138, and to an input side of a rotating clutch C35R, i.e., clutch 53. Node 146 is grounded to the stationary member 28.

A second gear set 150 includes nodes 152, 154, 156, and 158, which may be embodied as a sun gear (S1), ring gear (R1), carrier gear (PC1), and another sun gear (S2), respectively. A braking clutch CB26, i.e., clutch 43, may selectively connect node 158 to the stationary member 28. Node 154 is directly connected to the transmission output shaft 18. Node 156 is connected to a braking clutch CBR1, i.e., clutch 136, which is also connected to a stationary member 28.

Depending on the operating gear, the identity of the specific holding clutches will vary. The present method 100 may be used to learn the return spring pressure of a holding clutch. For instance, clutches 48 and 58 of FIG. 2 may act as holding clutches while coasting in $4^{th}$ gear. As all clutches in the transmission 14 apply via fluid pressure and release via a return spring, as is known in the art, knowledge of the return spring pressure may be used by the controller 26 to fine tune the overall control of that particular clutch.

Figure 4:
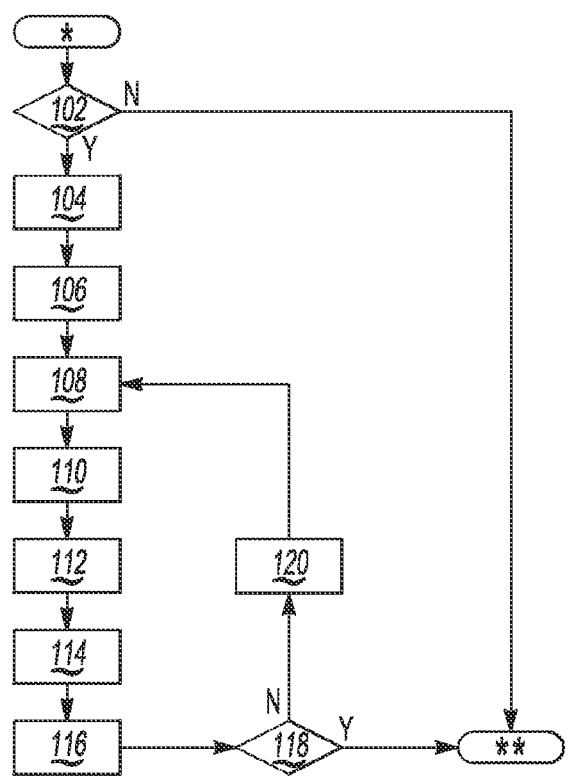
FIG. 4 is a flow chart describing an example method for learning a clutch return spring pressure during a coast-down maneuver.

Referring to FIG. 4, the present method 100 for learning the return spring of a clutch in a transmission such as the transmission 14 of FIG. 2 or the transmission 114 of FIG. 3 commences at step 102. In this initial step, the controller 26 of FIG. 1 determines the engine torque (arrow $T_E$) from the engine 12, e.g., via communication with the ECU 29, and determines whether this input torque is sufficiently stable or unchanging. Step 102 entails determining whether the vehicle 10 of FIG. 1 is traveling on an extended downgrade of a sufficient length for conducting the subsequent control steps. Step 102 may include initiating a timer of the controller 26 and counting through a calibrated duration to determine if the grade is merely transient or is in fact sustained. In an example embodiment, a stable engine input torque (arrow $T_E$) may be present at about levels of about 20 Nm+/−5 Nm.

At step 104, the controller 26 of FIG. 1 requests management of the engine torque (arrow $T_E$) at a first level, for instance by requesting active torque management from the ECU 29 which is then accomplished via spark retardation or other means. The first level may be a low threshold torque, e.g., about 25 Nm to about 15 Nm in one possible embodiment. The ECU 29 thereafter locks engine torque (arrow $T_E$) at this requested level.

At step 106, the controller 26 of FIG. 1 decreases the pressure command to both holding clutches in an embodiment in which only two clutches of the transmission 14 hold torque during the coast-down maneuver, from a level of their calibrated maximum pressure. As is understood in the art, a clutch pressure command may be determined as a function of transmission input torque ($T_I$) and a calibrated gain K, i.e., $P = f(T_{IN} \cdot K)$. The gain K can be modified over time as a result of the method 100 as noted below. Step 106 entails leaving one of the two holding clutches at a slightly higher pressure than the other, e.g., 5 to 10 kPA higher in an example embodiment.

Figure 5:
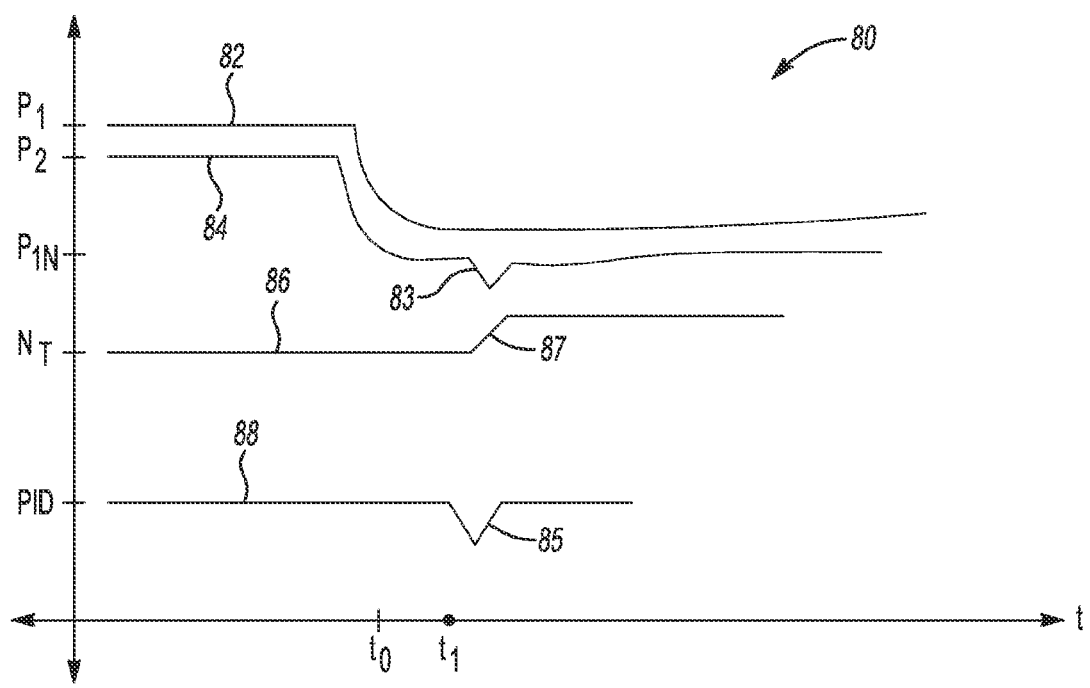
FIG. 5 is a time plot of clutch pressure, turbine speed, and a PID control signal.

Referring to FIG. 5 in conjunction with FIG. 4, a set of curves 80 may be used to demonstrate the present approach. The first holding clutch may have a pressure (trace 82) that is initially at a pressure level of $P_1$, and dropping at step 106 at about $t_0$ to a lower pressure level of $P_{1N}$ corresponding to that clutch's critical feed-forward pressure. The second holding clutch, with corresponding pressure trace 84, is dropped to a slightly lower level as noted above.

At step 108 of FIG. 4, the controller 26 of FIG. 1 then introduces a calibrated error 85 via a PID command (trace 88) in the integrator or I term at approximately $t_1$. This calibrated error 85 causes a slip to occur across the second holding clutch, and thus a small flare 87 to occur in turbine speed (trace 86), e.g., approximately 20 RPM to 30 RPM above the baseline level of the turbine speed before the flare 87 is introduced. The clutch pressure changes in response to the error 85, as indicated by arrow 83 in trace 84 of FIG. 5. The pressure (trace 84) should be given a calibrated amount of time to stabilize to within an allowable pressure window and within a calibrated duration. The error 85 should also be large enough to force a corrective action to occur in response to the error via the PID logic 90 of the controller 26, but yet small enough that the flare 52 is not perceptible to a driver of the vehicle 10 of FIG. 1. The particular value of the error 85 may be expected to vary with the design of the transmission 14. The controller 26 thereafter maintains the flare 52 by maintaining the slip across the second holding clutch.

At step 110, after the clutch pressure (trace 84) is sufficiently stable, the controller 26 records the relationship between the pressure (trace 84) to the second holding clutch after the error 85 is introduced at about $t_f$, and the input torque to the holding clutch. Step 112 may entail recording the pressure command and input torque as corresponding values in a lookup table.

At step 112 the controller 26 may request active torque management from the ECU 29 at a lower level than that requested at step 104, e.g., about 15 Nm to about 5 Nm. The ECU 29 thereafter locks the input torque from the engine 12 at this lower level.

At step 114, the controller 26 of FIG. 1 again records the relationship between the pressure command on the second holding clutch and the input torque to that clutch, this time as a second data point. As with step 110, step 114 may entail recording the pressure command and input torque as corresponding values in a lookup table.

At step 116, the controller 26 uses the two recorded data points to extrapolate the relationship between the pressure command on the second holding clutch and the input torque at 0 Nm of input torque, i.e., the return spring pressure. That is, knowing the relationship at, e.g., 15 Nm and 5 Nm, the controller 26 can estimate the relationship at 0 Nm.

At step 118, the controller 26 determines whether all holding clutches have been evaluated during this particular maneuver. If so, the method 100 is finished. Otherwise, the method 100 proceeds to step 120.

At step 120 the controller 26 may increase the pressure on the second holding clutch and decrease the pressure on the first holding clutch, i.e., swap traces 82 and 84 of FIG. 5. Thereafter, the controller 26 can repeat steps 108-116 for the first holding clutch to learn the return spring pressure of the first holding clutch. In all embodiments, the above method 100 proceeds only so long as the vehicle 10 of FIG. 1 remains in the coast-down maneuver. That is, step 102 may operate in a continuous loop evaluating whether steady state coasting conditions remain present, and can smoothly exit the method 100 when, for instance, a driver requests increased engine torque and thereby exits the coast-down maneuver. If the present method 100 has not finished executing at that point the controller 26 may disregard the incomplete results and start anew with the new coast-down maneuver.

While the best modes for carrying out the invention have been described in detail, those familiar with the art to which this invention relates will recognize various alternative designs and embodiments for practicing the invention within the scope of the appended claims.

The invention claimed is:

1. A method for determining a return spring pressure of a second holding clutch in a transmission of a vehicle having the transmission with a first holding clutch and the second holding clutch, an engine, and a torque converter having a pump connected to the engine and a turbine connected to the transmission, wherein the second torque holding clutch along with a first holding clutch holds an input torque from the engine in the transmission during a coast-down maneuver of the vehicle, the method comprising:

detecting the coast-down maneuver of the vehicle;

determining from among a plurality of clutches of the transmission the clutches that act as the first and the second holding clutches during the coast-down maneuver;

reducing a pressure command to the first holding clutch to a threshold level;

reducing a pressure command to the second holding clutch to a threshold level that is at least 5 kPA lower than the first holding clutch;

reducing an engine torque from the engine to a first torque level;

introducing a pressure error to a pressure command of the second holding clutch via a controller while the engine torque is held at the first torque level to thereby induce a slip level across the second holding clutch and a controlled flare in a speed of the turbine of the torque converter;

recording a first clutch input pressure/input torque relationship for the second holding clutch as the controller maintains the induced slip level during a duration of the flare;

reducing the engine torque from the first torque level to a second torque level;

recording a second clutch input pressure/input torque relationship for the second holding clutch as the controller continues to maintain the controlled slip level during a duration of the flare;

extrapolating the return spring pressure of the second holding clutch using the two recorded clutch input pressure/torque points; and using the extrapolated return spring pressure in a control action of the transmission involving the second holding clutch.

2. The method of claim 1, wherein recording the first clutch input pressure/input torque relationship and recording the second clutch input pressure/input torque relationship includes recording the first and second clutch input pressure/input torque relationships in a lookup table.

3. The method of claim 1, wherein reducing engine torque to the first torque level and reducing engine torque to the second torque level includes requesting, via the controller, a spark retardation level from an engine controller.

4. The method of claim 1, further comprising:
determining when the input torque to the transmission reaches a threshold level and remains sufficiently stable before recording the pressure/input torque relationship.

5. A vehicle comprising:
an engine;
an engine control unit (ECU) which manages engine torque;
a transmission having a set of clutches, including a first and second holding clutch engaged as holding clutches during a coast-down maneuver of the vehicle; and
a transmission controller having proportional-integral-derivative (PID) control logic, wherein the transmission controller is in communication with the engine control unit;
wherein the transmission controller is configured to:
use the PID control logic to introduce a calibrated error into a pressure command of the second holding clutch during the coast-down maneuver, wherein calibrated error causes a slip level to occur across the second holding clutch;
maintain the slip level using the PID control logic;
request, from the ECU, delivery of the engine torque at a pair of different threshold low values during the coast-down maneuver;
record the pressure/input torque relationship for the second holding clutch for both threshold low levels as the controller continues to maintain the slip level;
calculate a clutch return spring pressure for the second holding clutch using the recorded pressure/input torque relationship for the pair of different threshold low values; and
control the second holding clutch in a subsequent shift maneuver using the calculated clutch return spring pressure.

6. The vehicle of claim 5, wherein the controller calculates the return spring pressure by extrapolating the return spring pressure from the recorded pressure/input torque relationships.

7. The vehicle of claim 5, wherein the controller is configured to request the delivery of the engine torque at a pair of different threshold low values by requesting a pair of different spark retardation levels from an engine controller.

8. A system for use with a vehicle having an engine and an engine control unit (ECU) which manages engine torque, the system comprising:
a transmission having a set of clutches, including a first and second holding clutch each engaged as holding clutches to hold input torque from the engine in the transmission during a coast-down maneuver of the vehicle; and
a transmission controller having proportional-integral-derivative (PID) control logic, wherein the transmission controller is in communication with the engine control unit;
wherein the transmission controller is configured to:
use the PID control logic to introduce a calibrated error into a pressure command of the second holding clutch during the coast-down maneuver, wherein calibrated error causes a slip level to occur across the second holding clutch;
maintain the slip level using the PID control logic;
request, from the ECU, delivery of the engine torque at a pair of different threshold low values during the coast-down maneuver;
record the pressure/input torque relationship for the second holding clutch for both threshold low levels as the controller continues to maintain the slip level;
calculate a clutch return spring pressure for the second holding clutch using the recorded pressure/input torque relationship for the pair of different threshold low values; and
control the second holding clutch in a subsequent shift maneuver using the calculated clutch return spring pressure.

9. The system of claim 8, wherein the controller is configured to calculate the return spring pressure by extrapolating the return spring pressure from the recorded pressure/input torque relationships.

10. The system of claim 8, wherein the controller is configured to request the delivery of the engine torque at a pair of different threshold low values by requesting a pair of different spark retardation levels from an engine controller.

* * * * *